United States Patent
Thiele et al.

[15] 3,687,945
[45] Aug. 29, 1972

[54] BASIC β-THIENYL COMPOUNDS

[72] Inventors: Kurt Thiele, Frankfurt on Main; Klaus Posselt, Bergen-Enkheim, both of Germany

[73] Assignee: Deutsche Gold-und Silber-Scherdeanstalt vormals-Roessler, 3, Frankfurt on Main, Germany

[22] Filed: July 13, 1970

[21] Appl. No.: 54,643

Related U.S. Application Data

[63] Continuation-in-part of Ser. No. 842,722, July 17, 1969, abandoned.

[52] U.S. Cl...260/240 R, 260/332.2 R, 260/332.3 R, 260/332.3 C, 260/570.8 R, 424/275
[51] Int. Cl. .......................A61k 27/00, C07d 63/12
[58] Field of Search ....................260/332.3 R, 240 R

[56] References Cited

UNITED STATES PATENTS 3,251,858  5/1966  Thiele et al.............260/332.3
3,330,825  7/1967  Thiele et al.............260/240

OTHER PUBLICATIONS

N.B., References are avaiable to applicants thru S.N. 842,722 and need not be again supplied.

*Primary Examiner*—Henry R. Jiles
*Assistant Examiner*—Cecilia M. Shurk
*Attorney*—Cushman, Darby & Cushman

[57] ABSTRACT

Compounds are prepared having the formula

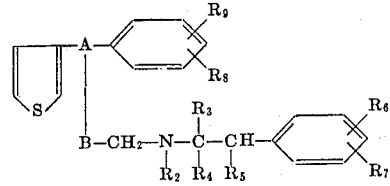

wherein the thienyl group can be substituted with one or more lower alkyl groups; the bridging member $$>A-B-$$

either has the structure $$>C(OH)-CH(R_1)-$$

or the structure $$>C=C(R_1)-$$

and $R_1$, $R_2$, $R_3$ and $R_4$ are hydrogen or lower alkyl groups, $R_5$ is hydrogen or hydroxy, $R_6$ and $R_7$ are the same or different and are hydrogen, halogen, hydroxy, lower alkyl, halo lower alkyl, or lower alkoxy and the groups $R_8$ and $R_9$ are the same or different and are hydrogen, hydroxy, lower alkyl or lower alkoxy and the salts thereof. The compounds are pharmacologically active, especially in peripheral and cerebral disorders of blood-flow.

11 Claims, No Drawings

BASIC β-THIENYL COMPOUNDS

This application is a continuation-in-part of application Ser. No. 842,722 filed July 17, 1969 and now abandoned.

In Austrian Pat. Nos. 235,832 and 240,850 there are described compounds of the following general formula as well as processes for their production

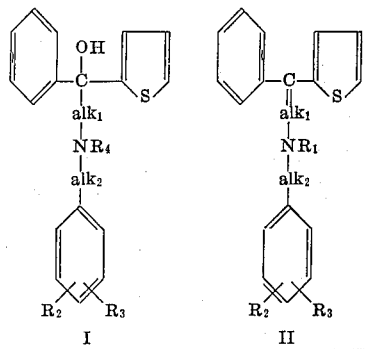

In these formulas $alk_1$ is a straight or branched chain saturated alkylene group with one to four carbon atoms in which at least two of the carbon atoms build the chain between the group

and the group

. $Alk_2$ is a straight or branched saturated lower alkylene group with at least two carbon atoms as the chain between the group $NR_4$ or $NR_1$ and the phenyl group, $R_2$ and $R_3$ are the same or different and are hydrogen, halogen, hydroxyl, or alkoxy. $R_4$ or $R_1$ is hydrogen or lower alkyl.

These compounds have central stimulating and coronary widening properties.

It has now been found that compounds which have a similar structure but in which the thienyl group is bound in the three position are pharmacologically active and especially increase the peripheral and cerebral blood flow.

The invention is concerned with new compounds of the general formula

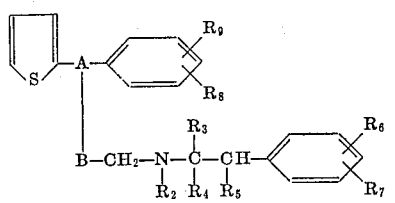

wherein the thienyl group can have one or more lower alkyl groups, e.g. methyl to hexyl, as substituents, bridge member

is either the structure

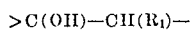

or the structure

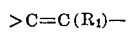

and $R_1$, $R_2$, $R_3$ and $R_4$ are hydrogen or lower alkyl, e.g. methyl to hexyl, $R_5$ is hydrogen or hydroxy, $R_6$ and $R_7$ are the same or different and are hydrogen, halogen (e.g. chlorine, bromine, fluorine or iodine), hydroxy, lower alkyl (e.g. methyl to hexyl), halo lower alkyl (e.g. chloro or bromo methyl to chloro or bromo hexyl, trifluoromethyl or lower alkoxy (e.g. methoxy, ethoxy or hexoxy), and $R_8$ and $R_9$ are the same or different and are hydrogen, hydroxy, lower alkyl (e.g. methyl to hexyl) or lower alkoxy (e.g. methoxy, ethoxy or hexoxy), and their pharmacologically acceptable acid addition salts.

The alkyl, haloalkyl and alkoxy groups generally contain one to six carbon atoms. An example of a haloalkyl group is trifluoromethyl.

The compounds of the present invention can be prepared by reacting a compound having the general formula

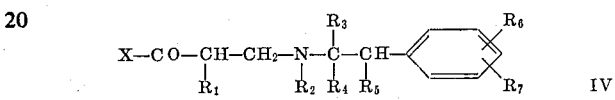

where X is the thienyl —(3)— group or the group

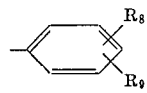

with either a thienyl —(3)— metal compound (when X is a phenyl or substituted phenyl group) or with a phenyl (or substituted phenyl) metal compound (when X is a thienyl —(3)— group). Compounds of the general formula III wherein

can be connected to the corresponding unsaturated compounds

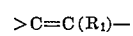

by the use of dehydrating agents in conventional fashion. If desired, the basic compounds can be converted into their salts by conventional methods.

The process for reacting a ketone of general formula IV with a metal organic compound, for example thienyllithium or thienyl Grignard or phenyllithium or phenyl Grignard is generally carried out at a temperature of −40° to +100°C. As solvents there can be used for example dialkyl ethers, e.g. diethyl ether, dibutyl ether and butyl ethyl ether, tetrahydrofurane, hydrocarbons, e.g. benzene. The Grignard compound can be formed in situ from magnesium and 3-chloro, bromo or iodothiophene or alkyl derivative thereof.

For the actual reaction it is only necessary to use one mole of metal organic compound. However, a corresponding excess of the metal organic compound is always necessary if the added compound IV contains an active hydrogen (amino, hydroxy, salt). It is recommended, however, generally in many cases to use an excess of metal organic compound since thereby better yields are obtained.

The dehydration of compounds wherein $>A—B—$ is $>C(OH)—CH(R_1)—$ is suitably carried out at higher temperatures, for example, in a temperature range of 20°–150°C. Examples of solvents employed are glacial acetic acid, benzene and dioxane.

As dehydrating agents there can be employed mineral acids such as sulfuric acid or hydrogen halides, e.g. hydrochloric acid and hydrobromic acid, organic acids, e.g. oxalic acid and formic acid, zinc chloride, boron trifluoride, potassium hydrogen sulfate, aluminum chloride, phosphorus pentoxide, aluminum oxide, acid chlorides, red phosphorus and iodine in the presence of water.

By the dehydration alkoxy groups present can be split to hydroxy group. This depends on the dehydration agent as well as the other conditions of this dehydration reaction.

Those compounds which contain asymmetrical carbon atoms and as a rule accumulate as racemates can in known manner, for example, by means of an optically active acid be split into the optically active isomers. It is also possible, however, to add optically active or diasterometric starting materials at the beginning whereby there are obtained as end products a corresponding pure optically active form or diasterometric configuration.

The conversion into salts is accomplished by known methods. As amions for the salts there can be employed the usually pharmacologically acceptable acid groups. Typical acids for forming the salts are hydrochloric acid, hydrobromic acid, sulfuric acid, phosphoric acid, acetic acid, propionic acid, citric acid, succinic acid, maleic acid, fumaric acid, lactic acid, p-toluene sulfonic acid and the like. As thienyl compounds which can be employed to form the Grignard reagent with magnesium there can be used 3-bromothiophene, 3-chlorothiophene, 3-bromo-2-methyl thiophene, 3-bromo-5-methyl thiophene, 3-chloro-5-methyl thiophene, 3-chloro-5-butyl thiophene, 3-bromo-5-hexyl thiophene, 3-bromo-2,5-dimethyl thiophene, 3-bromo-4-ethyl thiophene, 3-chloro-2,4-dimethyl thiophene, 3-bromo-2-ethyl thiophene, 3-bromo-2,4-dimethyl thiophene, 3-bromo-5-isopropyl thiophene. Thienyllithium compounds include thienyl-3-lithium, 2-methylthienyl-3-lithium, 2-butyl thienyl-3-lithium. Examples of phenyl or substituted phenyl lithium compounds include phenyl lithium, p-tolyl lithium, o-tolyl lithium, p-ethoxy phenyl lithium, p-butyl phenyl lithium, p-methoxy phenyl lithium halophenyl or substituted phenyl compounds for forming the Grignard reagents include chlorobenzene, bromobenzene, 1-methyl-4-bromobenzene, 1-methyl-3-chlorobenzene, 1-butyl-2-bromobenzene, 1-bromo-2,4-diethoxy benzene, 1-bromo-3-ethoxybenzene, 1-bromo-4-hexylbenzene, 1-bromo-4-sec. butyl benzene, 1-methoxy-2-bromobenzene, 1-methoxy-4-chlorobenzene, 1-methyl-2-methoxy-4-chlorobenzene, 1,3-dimethyl-4-bromobenzene, 1-bromo-2,4-dimethoxybenzene.

Compounds having formula IV include β-[1-phenylpropyl-(2)-amino]-propiothienone-(3); β-[1-phenyl-1-hydroxypropyl-(2)-amino]-propiothienone-(3); β-[1-phenylpropyl-(2)-amino]-propio-4-methyl thienone-(3); β-[1-phenylpropyl-(2)-amino]-propio-5-methylthienone-(3); β-[1-phenyl-1-hydroxypropyl(2)-amino]-propio-5-butylthienone-(3); β-[1-phenylpropyl-(2)-amino]-propio-5-hexylthienone-(3); β-[1-phenylpropyl-(2)-methyl amino]-propiothienone-(3); β-[1-phenyl-1-hydroxypropyl-(2)-ethylamino]-propiothienone-(3); β-[1-phenylpropyl-(2)-hexylamino]-propiothienone-(3); β-[1-phenyl-2-methylpropyl-(2)-amino]-propiothienone-(3); β-[1-phenyl-1-hydroxy-2-ethylpropyl-(2)-amino]-propiothienone-(3); β-[1-p-trifluoromethyl phenyl propyl-(2)-amino]-propiothienone-(3); β-[1-p-methylphenyl-1-hydroxypropyl-2-amino]-propiothienone-(3); β-[1-o-ethylphenyl-1-hydroxypropyl-2-amino]-propiothienone-(3); β-[1-m-butylphenyl propyl-(2)-amino]-propiothienone-(3);β-[1-p-chloro-o-methylphenyl-1-hydroxypropyl-(2)-amino]-propiothienone-(3); β-[1-p-hydroxyphenyl-1-hydroxypropyl-(2)-amino] -propiothienone-(3); β-[1-m, p-dihydroxyphenylpropyl-(2)-amino]-propiothienone-(3); β-[1-p-methoxyphenylpropyl-(2)-amino]-propiothienone-(3); β-[1-p-butoxyphenyl-1-hydroxypropyl-(3)-amino]-propiothienone-(3); β-[1-p-chloromethylphenylpropyl-(2)-amino]-propiothienone-(3); β-[1-phenyl-1-hydroxypropyl-(2)-methyl-(2)-amino]-propiothienone-(3); β-[1-phenyl-1-hydroxypropyl-(2)-amino]-2-methylpropiothienone-(3).

The starting compounds of formula IV where X is thienyl or alkyl substituted thienyl can be formed in known matter by reacting 3-acetyl thiophene or alkyl substituted 3-acetyl thiophenes, e.g. 2-methyl-3-acetylthiophene, 2,5-dimethyl-3-acetylthiopene, 4-ethyl-3-acetylthiophene or 2-hexyl-3-acetylthiophene with paraformaldehyde and the corresponding phenyl (or substituted phenyl) alkylamine using the procedure set forth in the U.S. application Ser. No. 693,138 filed Dec. 26, 1967 now U.S. Pat. No. 3,514,465, issued May 26, 1970 for example. Thus 1-β-[1-phenyl-1-hydroxypropyl-(2)-amino]-propiothienone-(3). HCl (M.P. 195°–196°C.) can be formed by reacting 1 mole of 3-acetylthiophene with 1 mole of paraformaldehyde and 1-mole of 1-nerophedrin-hydrochloride in isopropanol.

Examples of compounds within the present invention are [1-thienyl-(3)-1-phenyl-1-hydroxypropyl-(3)]-[1-phenyl-1-hydroxypropyl-(2)]-amine; (1-[2,5-dimethylthienyl-(3)] -[1-phenyl-1-hydroxypropyl-(3)]-[1-phenyl-1-hydroxpropyl-(2)]-amine; [1-thienyl-(3)-1-phenyl-propen-(1)-yl-(3)]-[1-phenyl-1-hydroxypropyl-(2)]-amine; [1-thienyl-(3)-1-p-isopropylphenyl-1-hydroxypropyl-(3)]-[1-phenyl-1-hydroxypropyl-(2)]-amine; [1-thienyl-(3)-1-p-isopropylphenyl-propen-(1)-yl-(3)]-[1-phenyl-1-hydroxypropyl-(2)]-amine; [1-thienyl-(3)-1-m-methoxyphenyl-hydroxypropyl-(3)]-[1-phenyl-1-hydroxypropyl-(2)]-amine; [1-thienyl-(3)-1-m-methoxyphenyl-propen-(1)-yl-(3)]-[1-phenyl1-hydroxypropyl-(2)]-amine; [1-thienyl-(3)-1-m, p-Almethylphenyl-1-hydroxypropyl-(3)]-[1-phenyl-1-hydroxypropyl-(2)]-amine; [1-thienyl-(3)-1-m,p-dimethylphenylpropen-(1)-yl-(3)]-[1-phenyl-1-hydroxypropyl-(2)]-amine; [1-thienyl-(3)-1-phenyl-1-hydroxy-2-methylpropyl-(3)]-[1-phenyl-1-hydroxypropyl-(2)]-amine; [1-thienyl-(3)-1-phenyl-2-methylpropen-(1)-yl-(3)]-[1-phenyl- 1-hydroxypropyl-(2)]-amine; [1-thienyl-(3)-1-phenyl-1-hydroxypropyl-(3)]-[1-phenyl-1-hydroxypropyl-(2)]-methylamine; [1-thienyl-(3)-1-phenylpropen-(1)-yl-(3)]-[1-phenyl-1-hydroxypropyl-(2)]-methylamine; [1-thienyl-(3)-1-phenyl-1-hydroxypropyl-(3)]-[1-p-chlorophenyl2methyl-propyl-(2)]-amine; [1-thienyl-(3)-1-phenyl propen- (1)-yl-(3)]-[1-p-chlorophenyl-2-methylpropyl-(2)]-amine; [1-thienyl-(3)-1-hydroxypropyl-(3)]-(2-p-t-butylphenyl-2-hydroxyethyl)amine; [1-thienyl-(3)-1-phenylpropen-(1)-yl-(3)]-(2-p-t-butylphenyl-2-hydroxyethyl)amine; [1-thienyl-(3)-1- phenyl-1-hydroxypropyl-(3)]-(2-p-fluorophenyl-2-hydroxyethyl)-amine; [1-thienyl-(3)-1-phenylpropen-(1)-yl-(3)]-(2-p-fluorophenyl-2-hydroxyethyl)amine; [1-thienyl-(3)-1-phenyl-1-hydroxy-propyl-(3)]-(2-p-chlorophenyl-2-hydroxyethyl)-amine; [1-thienyl-(3)-1-phenylpropen-(1)-yl-(3)]-(2-p-chlorophenyl-2-hydroxyethyl)-amine; [1-thienyl-(3)-1-phenyl-1-hydroxypropyl-(3)]-(2-m-trifluoromethylphenyl-2-hydroxyethyl)-amine; [1-thienyl-(3)-1-phenylpropen-(1)-yl-(3)]-(2-m-trifluoromethylphenyl-2-hydroxyethyl)-amine; [1-thienyl-(3)-1-phenyl-1-hydroxypropyl-(3)]-[2-(2,5-dimethylphenyl)-2-hydroxyethyl]-amine; [1-thienyl-(3)-1-phenylpropen-(1)-yl-(3)]-[2-(2,5-dimethylphenyl)-2-hydroxyethyl]-amine; [1-thienyl-(3)-1-phenyl-1 -hydroxypropyl-(3)]-(2-p-methoxyphenyl-2-hydroxyethyl)-amine; [1-thienyl-(3)-1-phenyl-1-hydroxypropyl-(3)]-(2-p-hydroxyphenyl-2-hydroxyethyl)-methylamine; [1-thienyl-(3)-1-phenyl-1-hydroxypropyl-(3)]-[1-p-hydroxyphenyl-1-hydroxypropyl-(2)]-amine; (1-[2-butylthienyl-(3)]-1-phenyl-1-hydroxypropyl-(3))-[1-(2,4-dihydroxyphenyl)-1-hydroxypropyl-(2)]-amine; (1-[2-methylthienyl)-(3)]-1-p-hydroxyphenyl-1-hydroxypropyl-(3))-[1-(2-hydroxy-4-ethoxyphenyl)-1-hydroxypropyl-(2)]-amine; [1-thienyl-(3)-1-o,p-dihydroxyphenyl-1-hydroxypropyl-(3)]-[1-(p-2-chloroethylphenyl)-1-hydroxypropyl-(2)]-amine; [1-thienyl-(3)-1-(2,3-diethoxyphenyl)-1-hydroxypropyl (3)]-[1-(2,4-dichlorophenyl)-1-hydroxypropyl-(2)]-amine.

The compounds of the invention as indicated are pharmacologically active and primarily increase the peripheral and cerbral blood flow. They are therefore useful in increasing cerebral and muscle blood flow. The pharmaceutical compositions or medicaments can contain one or more of the compounds of the invention as well as mixtures of these with other pharmacologically active materials. The production of medicaments can be carried out using the customary pharmaceutical carriers. The compounds are useful as medicines in the human, veterinary and agricultural fields.

The compounds of the invention were tested on dogs (whole animal) for their activity on cerebral and peripheral blood flow.

Their toxicity (LD$_{50}$ mg/kg) was tested on mice by oral application according to the method of Miller and Tainter (Proc. Soc. Exper. Biol. a. Med. 57, 261 (1944)).

The compounds of the invention caused an increase in the peripheral and cerebral blood flow in dogs (entire animal) at a dosage of 0.05 to 5 mg/kg.

The pharmacological administration of the compounds is by the usual standard methods for administration of compounds which are active in improving circulatory flow. The application can be done, for example, enterally, parenterally, orally, perlingually or in the form of sprays. Delivering can be carried out in the form of tablets, capsules, pills, coated pills (dragees), suppositories, liquid consonants, or aerosols. As liquid consonants there can be employed oily or aqueous solutions or suspensions.

The individual dosage rate for human being is between 1 and 100 mg. of active component one or more times a day.

Nicotinyl alcohol can be used as a comparative substance for pharmacological activity.

The acid addition salts also can be used to cure resins, e.g. melamine formaldehyde resins.

Unless otherwise indicated all parts and percentages are by weight.

EXAMPLE 1

1-[1-thienyl-(3)-1-phenyl-1-hydroxypropyl-(3)]-[1-phenyl-1-hydroxypropyl-(2)]-amine

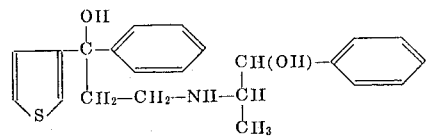

The Grignard compound was prepared from 12.1 grams (0.5 mole) of magnesium shavings and 78.5 grams (0.5 mole) of bromobenzene in 150 ml. of absolute ether. To this solution was added a suspension of 32.5 grams (0.1 mole) of 1-β-[1-phenyl-1-hydroxypropyl-(2)-amino]-propiothienone-(3). HCl in 200 ml. of absolute benzene and held 2 hours at the boiling point. After that it was decomposed with 25 g. of ammonium chloride in 250 ml. of 10 percent aqueous ammonia, the organic phase separated, dried with potassium carbonate and the solvent distilled off. The base remaining behind was dissolved in 200 ml. of ether and neutralized with 10 percent isopropanolic HCl whereby the HCl salt precipitated. The salt was recrystallized from water, yield of salt 17 grams, M.P. 214°–215°C.

EXAMPLE 2

1-(1-[2,5-dimethylthienyl-(3)]-1-phenyl-1-hydroxypropyl (3))-[1-phenyl-1-hydroxypropyl-(2)]-amine

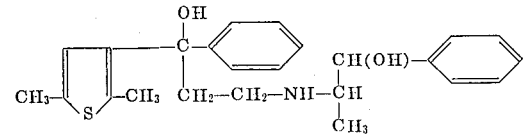

The Grignard compound was prepared from 12.1 grams (0.5 mole) of magnesium shavings and 78.5 grams (0.5 mole) of bromobenzene in 150 ml. of absolute ether. This was reacted with 35.4 grams (0.1 mole) of 1- β-[1-phenyl-1-hydroxypropyl-(2)-amino]-2,5-dimethylpropiothienone-(3). HCl in 200 ml. of absolute benzene and worked up as in example 1. The HCl salt formed was recrystallized from 20 percent aqueous ethanol and finally from methyl ethyl ketone, yield of salt 12 grams, MP 192°–193°C.

EXAMPLE 3

1-[1-thienyl-(3)-1-phenylpropen-(1)-yl-(3)]-[1-phenyl-1-hydroxypropyl-(2)]-amine

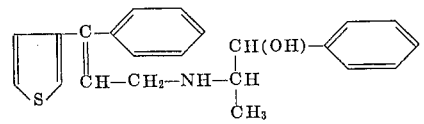

In a suspension of 16 grams (0.04 mole) of 1-[1-thienyl-(3)-1-phenyl-1-hydroxypropyl-(3)]-[1-phenyl-1-hydroxypropyl-(2)]-amine. HCl (prepared as in example 1) in 150 ml. of glacial acetic acid there was introduced HCl gas whereby the starting material went into solution and after about 20 minutes the HCl salt of the reaction product precipitated. The HCl salt was recrystallized from 20 percent aqueous ethanol, yield 10 grams, MP 228°–230°C.

EXAMPLE 4

1-[1-thienyl-(3)-1-phenyl-1-hydroxy-2-methyl-propyl-(3)]-[1-phenyl-1-hydroxy-propyl-(2)]-amine

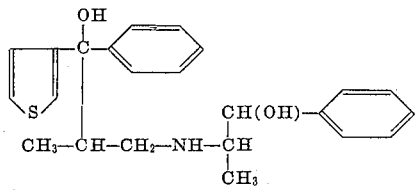

The Grignard compound was prepared from 12.1 grams (0.5 mol) of magnesium and 78.5 grams (0.5 mol) of bromobenzene in 150 ml of absolute ether and reacted with 33.9 grams (0.1 mol) of 1-α-methyl-β-[1-phenyl-1-hydroxy-propyl-(2)-amino]-propiothienone-(3)·HCl in 200 ml of absolute benzene and worked up essentially as in example 1. The base (F. 62°–68° C.), which solidified upon treating with ether, was dissolved in 100 ml of acetone and precipitated as the hydrochloride with isopropanolic HCl The salt was recrystallized from acetone. Yield 8 grams. M.P. 184°–185° C.

EXAMPLE 5

1-[1-thienyl-(3)-1-p-isopropylphenyl-1-hydroxy-propyl-(3)]-[1-phenyl-1-hydroxy-propyl-(2)]-amine

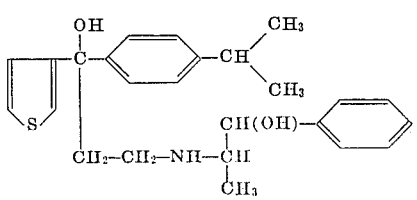

The Grignard compound was prepared from 12.1 grams (0.5 mol) of magnesium and 99.5 grams (0.5 mol) of 4-bromocumene in 150 ml of absolute ether and reacted with 32.5 grams (0.1 mol) of 1-β-[1-phenyl-1-hydroxypropyl-(2)-amino]-propiothienone-(3)·HCl in 200 ml of absolute benzene and worked up as in example 1. The hydrochloride was recrystallized from isopropanol. Yield 10 grams. M.P. 220°–221° C.

EXAMPLE 6

1-[1-thienyl-(3)-1-m,p-dimethylphenyl-1-hydroxypropyl-(3)]-[1-phenyl-1-hydroxy-propyl-(2)]-amine

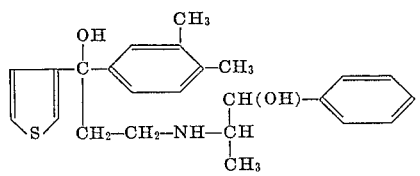

The Grignard compound was prepared from 12.1 grams (0.5 mol) of magnesium and 92.5 grams (0.5 mol) of 4-bromo-o-xylene in 150 ml of absolute ether and reacted with 32.5 grams (0.1 mol of 1-β-[1-phenyl-1-hydroxy-propyl-(2)-amino]-propiothienone-(3)·HCl in 200 ml of absolute benzene and worked up as in example 1. The hydrochloride was recrystallized from water. Yield 9 g. M.P. 185°–188° C.

EXAMPLE 7 d, 1-[1-thienyl-(3)-1-phenyl-1-hydroxy-propyl-(3)]-[2-(4-fluorophenyl)-2-hydroxyethyl]-amine

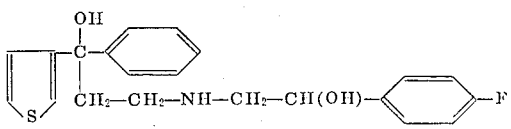

The Grignard compound was prepared from 9.8 grams (0.4 mol) of magnesium and 62.8 grams (0.4 mol) of bromobenzene in 120 ml. of absolute ether and reacted with 29.3 grams (0.1 mol) of d, 1-β-[2-(4-fluorophenyl)-2-hydroxyethylamino]-propiothienone-(3) [M.P. 152°C., produced by reaction of β-dimethylamino-propiothienone-(3)·HCl with 2-(4-fluorophenyl)-2-hydroxyethylamine in ethanol-water at room temperature ] in 180 ml. of benzene and worked up as in example 1.

The hydrochloride salt was recrystallized from isopropanol. M.P. 180°C., yield 8 grams.

EXAMPLE 8 d, 1-[1-thienyl-(3)-1-phenyl-1-hydroxypropyl-(3)]-[2-(4-t-butylphenyl)-2-hydroxyethyl]-amine

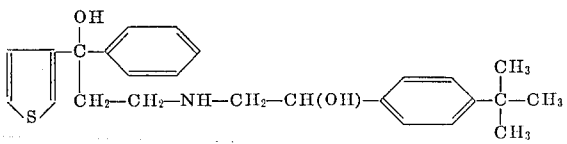

The Grignard compound was prepared from 9.8 grams (0.4 mol) of magnesium and 62.8 grams (0.4 mol) of bromobenzene in 120 ml. of absolute ether and reacted with 26.5 grams (0.08 mol) of d, 1-β-[2-(4-t-butylphenyl)-2-hydroxyethylaminino]-propiothienone-(3) [M.P. 133°C., produced by reaction of β-dimethylamino-propiothienone-(3)·HCl with 2-(4-t-butyl-phenyl)-2-hydroxyethylamine in ethanol-water at room temperature] in 180 ml. of absolute benzene and worked up as in example 1. The hydrochloride salt was recrystallized from isopropanol-ether, M.P. 163°C. Yield 3 grams.

EXAMPLE 9 d, 1-[1-thienyl-(3)-1-phenyl-1-hydroxy-propyl-(3)]-[2-(4-chlorophenyl)-2-hydroxyethyl] amine

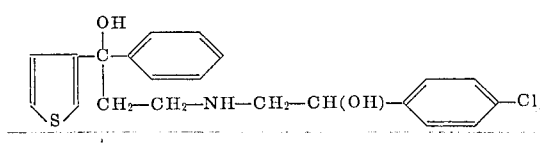

The Grignard compound was prepared from 7.3 grams (0.3 mol) of magnesium and 47.1 grams (0.3 mol) of bromobenzene in 100 ml. of absolute ether and reacted with 20.8 grams (0.06 mol) of d, 1-β-[2-(4-chlorophenyl)-2-hydroxyethylamino]-propiothienone-(3)·HCl (M.P. 160°C., produced by reaction of β-dimethylamino-propiothienone-(3)·HCl and 2-(4-chlorophenyl)-2-hydroxyethyl-amine in ethanol-water at room temperature) in 150 ml. of absolute benzene and worked up as in example 1. The hydrochloride salt was recrystallized from isopropanol-ether, M.P. 196°C. Yield 4 grams.

EXAMPLE 10

1-[1-thienyl-(3)-1-phenyl-2-methyl-propen-(1)-yl-(3)]-[1-phenyl-1-hydroxy-propyl-(2)]-amine

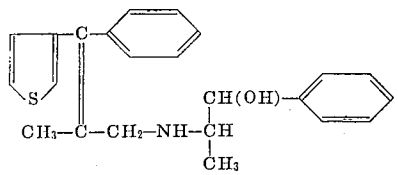

4.1 grams (0.01 mol) of 1-[1-thienyl-(3)-1-phenyl-1-hydroxy-2-methylpropyl-(3)]-[1-phenyl-1-hydroxypropyl-(2)]-amine·HCl were suspended in 30 ml. of glacial acetic acid and treated with HCl gas until completely dissolved. The solvent was distilled off, the residue made alkaline with ammonia and the base dissolved in ether. The hydrochloride salt was produced by neutralization of the ether solution with isopropanolic HCl and was recrystallized from isopropanol, M.P. 215°–216°C., yield 3 grams.

EXAMPLE 11

1-[1-thienyl-(3)-1-(4-isopropyl-phenyl)-propen-(1)-yl-(3)]-[1-phenyl-1-hydroxypropyl-(2)]-amine

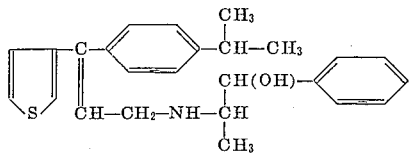

4.4 grams (0.01 mol) of 1-[1-thienyl-(3)-1-p-isopropylphenyl-1-hydroxypropyl-(3)]-[1-phenyl-1-hydroxypropyl-(3)]-amine·HCl were suspended in 30 ml. of glacial acetic acid and HCl gas introduced for 30 minutes. The solvent was distilled off and the residue treated with ammonia. The base was dissolved in ether and converted to the hydrochloride salt with isopropanolic HCl. The salt was recrystallized from ethanol, M.P. 236°–237°C. Yield 2 grams.

EXAMPLE 12

1-[1-thienyl-(3)-1-phenyl-propen-(1)-yl-(3)]-[1-phenyl-1-hydroxypropyl-(2)]-methylamine

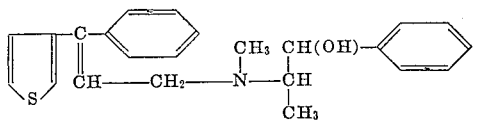

The Grignard compound was prepared from 7.2 grams (0.3 mol) of magnesium and 47.2 grams (0.3 mol) of bromobenzene in 100 ml. of absolute ether. To this solution was added a suspension of 17 grams (0.05 mol) of 1-β-[1-phenyl-1-hydroxypropyl-(2)-methylamino]-propiothienone-(3)·HCl (M.P. 145°C., produced by reaction of 3-acethylthiophene with paraformaldehyde and 1-ephedrin.HCL in isopropanol at room temperature) in 100 ml. of absolute benzene and held for 3 hours at the boiling point. Then it was decomposed with a solution of 25 grams of ammonium chloride in 250 ml. of ice water, the organic phase separated, dried with potassium carbonate and the solvent distilled off. The base remaining behind was dissolved in ether, converted into the hydrochloride salt with isopropanolic HCl. The salt was recrystallized from ethanol, M.P. 202°–203°C. Yield 6 grams.

EXAMPLE 13

1-[1-thienyl-(3)-1-phenyl-1-(3,4-dimethylphenyl)-propen-(1)-yl-(3)]-8 1-phenyl-1-hydroxypropyl-(2)]-amine

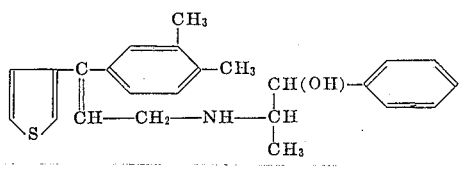

21.6 grams (0.05 mol) of 1-[1-thienyl-(3)-1-m,p-dimethylphenyl-1-hydroxypropyl-(3)]-[1phenyl-1-hydroxypropyl-(2)]-amine.HCL were suspended in 100 ml. of glacial acetic acid and treated with HCl gas until completely dissolved. The solvent was distilled off, the residue treated with ammonia and the base dissolved in ether. It was converted to the hydrochloride with isopropanolic HCl and recrystallized from 50 percent aqueous ethanol, M.P. 215°–217°C., yield 7 grams.

The β-dimethylamino-propiothienone hydrochloride used in examples 8 and 9 was prepared from 3-acetylthiophene, paraformaldehyde and dimethylamine hydrochloride in an analogous manner to the starting compound of example 11.

What is claimed is:
1. A compound selected from the group consisting of compounds having the formula

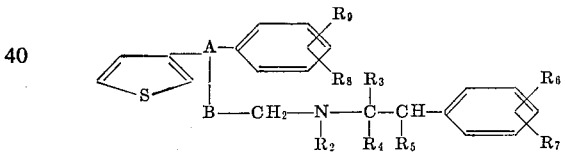

wherein the thienyl ring is unsubstituted or has one or more lower alkyl groups attached thereto, bridge member >A—B— is >C(OH)—CH(R₁)— or >C=C(R₁)—

>A—B— is >C(OH)CH(R₁)—

R₁, R₂, R₃ and R₄ are hydrogen or lower alkyl, R₅ is hydrogen or hydroxyl, R₆ and R₇ are hydrogen, halogen, hydroxy, lower alkyl, halo lower alkyl or lower alkoxy and R₈ and R₉ are hydrogen, hydroxy, lower alkyl or lower alkoxy and their pharmacologically acceptable acid addition salts.

2. A compound according to claim 1 where

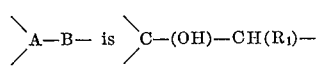

3. A compound according to claim 2 wherein the thienyl ring is unsubstituted.
4. A compound according to claim 3 where R₅ is hydroxyl.
5. A compound according to claim 4 wherein R₁, R₂ and R₄ are hydrogen, R₃ is methyl and R₆, R₇, R₈ and R₉ are hydrogen.

6. A compound according to claim 1 where $>$A—B— is $>$C(OH)—CH(R$_1$)—

7. A compound according to claim 6 wherein the thienyl ring is unsubstituted.

8. A compound according to claim 7 wherein R$_5$ is hydroxyl.

9. A compound according to claim 8 wherein R$_1$, R$_2$ and R$_4$ are hydrogen, R$_3$ is methyl and R$_6$, R$_7$, R$_8$ and R$_9$ are hydrogen.

10. A compound according to claim 1 wherein R$_5$ is hydroxyl, wherein R$_8$ and R$_9$ are hydrogen, R$_6$ is halogen, or lower alkyl, R$_7$ is hydrogen and $>$A—B— is $>$C(OH)—CH(R$_1$)— where R$_1$ is hydrogen.

11. A compound according to claim 1 wherein R$_5$ is hydroxyl, wherein R$_8$ is hydrogen or lower alkyl, R$_9$ is hydrogen, R$_6$ and R$_7$ are hydrogen and $>$A—B— is $>$C(OH)—CH(R$_1$)— where R$_1$ is hydrogen or lower alkyl.

* * * * *